Figure 1:
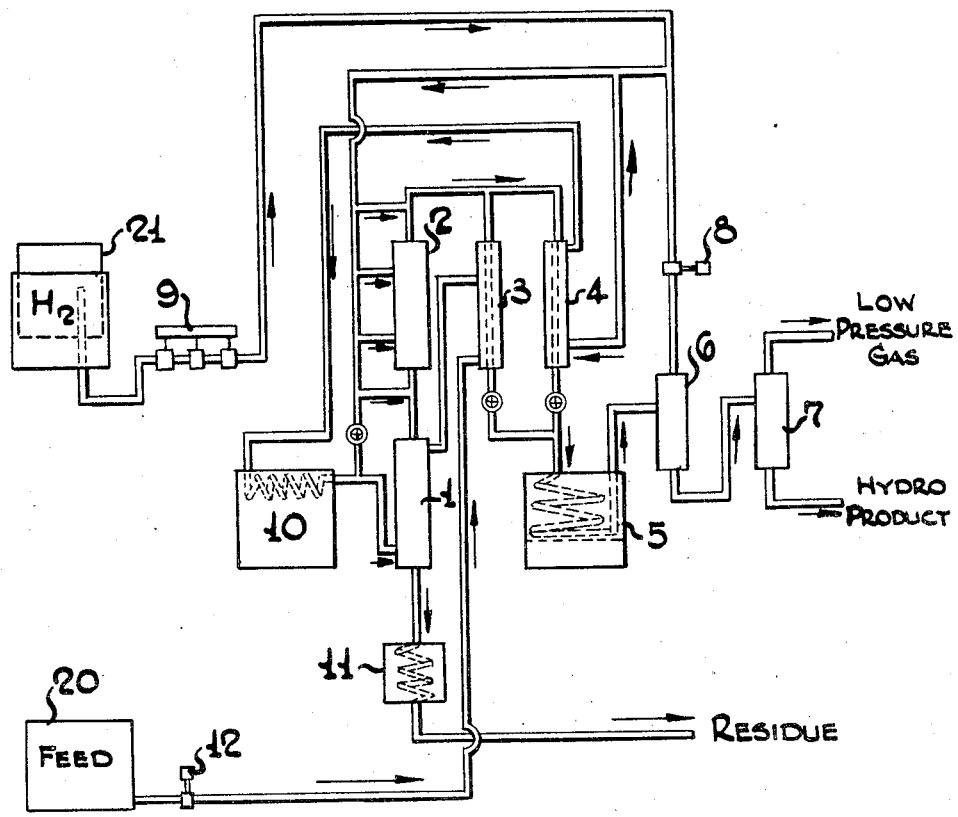

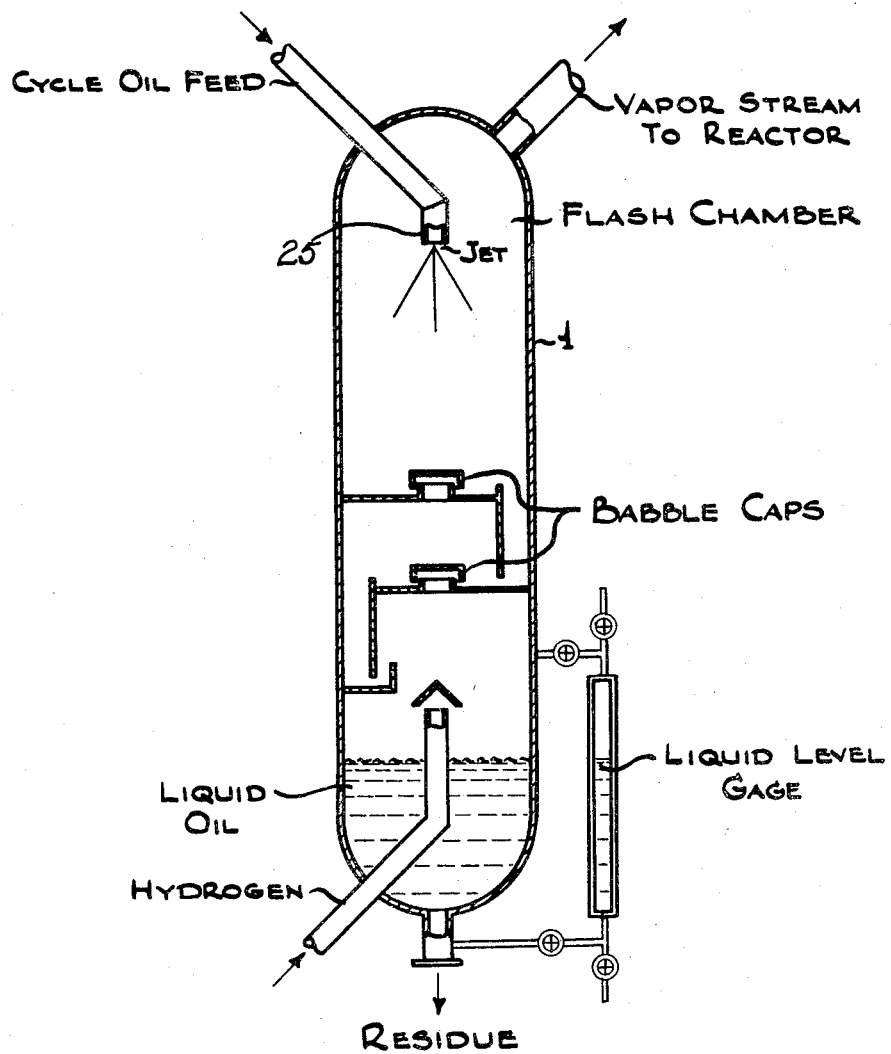

Patented Feb. 6, 1951

2,540,582

UNITED STATES PATENT OFFICE 2,540,582

HYDROGENATION

William G. Hockberger, Baton Rouge, La., assignor to Standard Oil Development Company, a corporation of Delaware Application June 1, 1945, Serial No. 596,997

10 Claims. (Cl. 260—580)

The novel features of my invention are disclosed in the ensuing specification and claims considered in connection with the accompanying drawing.

The object of my invention is to purify and to vaporize in an economical and expeditious manner a normally liquid material containing impurities which are unstable or non-volatile.

I may cite several specific applications of my improvements to illustrate my invention as follows: First in the case where it is desired to hydrogenate nitroxylenes, the nitroxylenes feed invariably contains dinitro derivatives. When such materials are heated to high temperatures, such as those employed in the hydrogenation reaction or in distillation, they are likely to explode, and according to my improvements the dinitro xylenes are separated by stripping with hydrogen in a manner which will be explained more fully hereinafter. It is true, of course, that the dinitro xylenes could be removed by vacuum or steam distillation, but this is an expensive and cumbersome procedure, always subject to the danger of air leaks and explosions.

Further applications to which my improvements apply in which hydrogen stripping is used in connection with a subsequent hydrogenation, are as follows:

(1) High boiling residues from coal tar or petroleum sources which are liable to be decomposed during distillation.

(2) Natural oils such as fish oils, terpenes, rosin, castor oil, tung oil, etc.

(3) Polymers of cyclopentadiene, isobutylene, etc., which tend to depolymerize when heated to high temperature with loss in yield or with product contamination.

(4) Cracked naphtha fractions which contain or which tend to form gum and coke when evaporated. (A flux oil could be circulated to prevent evaporation to dryness.)

(5) Materials derived from petroleum, shale, coal, etc., which contain high boiling or inorganic residues that would cause plugging or adversely affect catalyst activity.

While the greatest advantage is shown when vacuum distillation is the only alternative, the stripping process is also applicable whenever distillation is needed. Stripping ensures true vapor phase operation, and prevents the concentration of high boiling liquid residues in the reactor. In cases where substantially all of the feed is vaporized, the stripper may serve as a flash tower or scrubbing tower, with or without addition of stripping hydrogen.

To illustrate my invention more fully, I shall describe in detail the application of my improvements to the hydrogenation of a hydrocarbon oil contaminated with a powdered solid, such as powdered catalyst which, unless removed, would cause plugging in the transfer lines and other portions of the system in which the oil containing the powdered material was being treated.

In the accompanying drawing, I have shown in Figure 1 diagrammatically a flow plan which will illustrate a preferred modification of my invention; and in Figure 2, I have shown in an enlarged view a stripping column in partial vertical section so that the internal construction may be seen.

Referring in detail to the drawing, I represents a hydrogen stripper, 20 represents a feed storage tank which contains hydrocarbons produced as a result of cracking, which hydrocarbons contain aromatics and olefins but may also be contaminated with a quantity of powdered catalyst, which unless removed would cause plugging of the apparatus. The oil is withdrawn from storage tank 20 and pumped by pump 12 through a heat exchanger 3 and thence, into the top of hydrogen stripper 1. Simultaneously, a hydrogen containing gas is withdrawn from a gas holder 21, pumped through a compressor 9 (3 stages), and thereafter passed downwardly through a heat exchanger 4, withdrawn from the latter and passed into a furnace 10 and finally discharged into the bottom of hydrogen stripper 1 where it flows upwardly against the downflowing oil.

In Figure 2, I have shown a preferred modification of the hydrogen stripper 1 which consists essentially of a vertical vessel which, for example, may be 4 feet in diameter by 16 feet in height, and which contains a flash chamber a, jet 25 for atomizing the feed, two bubble cap plates for stripping the residual liquid, and a bottom chamber into which the hydrogen is introduced and in which a liquid level is maintained. Many modifications of the stripper shown are possible, such as substitution of a packed section for the bubble cap plates.

Returning now to Figure 1, the hydrogen vaporizes a portion of the oil in stripper 1 and carries it into a hydrogenation reactor 2 where the desired hydrogenation takes place in the presence of a suitable catalyst under conditions well-known to the art which need not be described in detail here, since my invention does not primarily relate to improvement in the hydrogenation reaction, per se, whereupon the hydrogenated oil is withdrawn overhead and thence, passed downwardly and in parallel through the heat exchangers 3 and 4, cooled in a water condenser 5, discharged into a high pressure separator 6 from which hydrogen may be recovered overhead, and pumped by pump 8 through heat exchanger 4, and then recycled to furnace 10 for further use in the process. Meanwhile, the bottoms from high pressure separator 6 are discharged into a low pressure separator 7 from which a low pressure gas may be recovered overhead, while the hydrogenated product is taken off as bottoms.

Referring to the hydrogen stripper 1, the bottoms containing the catalyst are withdrawn and discharged into a residue cooler 11 and eventually rejected from the system. If it becomes necessary to cool the reactor 2, cool hydrogen may be injected at several points into the reactants in the reactor itself, or into the stream issuing from the reactor, or that entering the reactor, or at all points.

For better understanding of the process, a specific application will be described. Approximately 5000 barrels of cracked gas oil, boiling within the range of from 400–700° F. and also containing small quantities of non-volatile materials such as catalyst fines, are to be hydrogenated at a temperature of from 600–800° F. and 750 pounds per square inch to saturate the olefinic and aromatic hydrocarbons and to remove sulfur and nitrogen containing compounds. This material is to be processed at a feed rate of 5,000 barrels per stream day. The non-volatile materials are likely to produce plugs in the unit if allowed to remain in the system. Accordingly, the feed is stripped with hydrogen in the manner previously described; a 3% (150 B/SD)[1] liquid residue containing the non-volatile materials is withdrawn and the vapor hydrogen stream passes on to the hydrogenation reactor.

| | |
|---|---|
| Feed rate, B/SD | 5,000 |
| Stripping gas, CF/B | 10,000 |
| MMCF/SD | 50 |
| Cooling gas, CF/B | 5,000 |
| MMCF/SD | 25 |
| Fresh hydrogen, CF/B | 1,000 |
| MMCF/SD | 5 |
| Pressure, p. s. i. g. max. | 750 |
| Heat of reaction, MMBTU/hr. | 10.9 |
| Latent heat + losses, MMBTU/hr. | 9.3 |
| Temperatures: | |
| Feed to stripper, °F. | 575 |
| Gas to stripper, °F. | 825 |
| Catalyst, max., °F. | 750 |
| Gas to furnace, °F. | 600 |

Suppose it were desired to hydrogenate nitroxylenes to form xylidines. Crude nitroxylenes contain as much as 10% dinitro xylenes and enough tarry material to necessitate a distillation step to clean up the feed. The heat of hydrogenation during conversion of nitroxylenes to xylidines is so great that 1,000 to 1,400 per cent of hydrogen is needed to absorb the heat of reaction. The distillation of the nitroxylenes must ordinarily be carried out under vacuum or with steam in order to avoid heating the dinitro xylenes to excessive temperatures. According to the present invention, temperatures as low as 285° F. may be used, but the temperature may be raised to at least 350° F., which temperature can be obtained with 125 pounds steam pressure. At 300° F. the vapor pressure of the nitroxylenes will be of the order of 50 mm.; with 1,000 per cent of hydrogen, the pressure would be 0.725 atmosphere. With 1,400 per cent hydrogen, the pressure would be approximately 1 atmosphere. According to my invention, the crude nitroxylenes feed is stripped with hydrogen in 1, and at a temperature below the limit dictated by considerations of safety and of decomposition, and thereafter, the vapor hydrogen stream is subjected to catalytic hydrogenation conditions suitable for the production of xylidine in reactor 2. The temperature used in the hydrogenation may be equal to or higher than that in the stripping zone. The pressure used will not be higher than that used in the stripping step which in turn will not be more than 20 atmospheres absolute. Since my invention does not go to the hydrogenation of nitroxylenes, per se, but, as in the case of gas oil hydrogenation, refers rather to the method of preparing and conditioning the feed, any suitable hydrogenation catalyst may be used and the usual precautions and expedients for the recovery of product, conversion of heat, and reactants and the other details of efficient operation which are already known to the prior art, may be employed in actually effecting the desired hydrogenation.

To recapitulate, my invention comprises the separation of high boiling, violently decomposable materials which have previously been isolated by vacuum distillation or of non-volatile constituents present in a given feed. I propose to use hydrogen to vaporize a portion of a feed stock which is to be passed to a hydrogenation operation, and my procedure may be used in any process wherein distillation is required. My invention also contemplates removing stable high-boiling materials from a liquid by a stripping action or with stripping accomplished by a distillation.

Numerous modifications of my invention may be made by those who are familiar with this art.

Having described my invention in the best manner in which it may be performed, what I claim is:

1. In the combined method of preparing a normally liquid material for hydrogenation in the vapor phase by removal therefrom of undesired constituents and hydrogenating the desired constituents, the improvement which comprises subjecting the normally liquid oil to contact with hydrogen at temperatures above that of the normally liquid oil in a stripping zone, whereby a mixture of gasiform material containing hydrogen, the material to be hydrogenated, and a high boiling residue are formed, and thereafter, conducting the said mixture to a hydrogenation zone where it is subjected to hydrogenation in the presence of a suitable catalyst and under suitable hydrogenation conditions.

2. The method set forth in claim 1 in which the normally liquid material is a cracked gas oil containing powdered catalyst material.

3. The method of claim 1 in which the normally liquid material is crude nitroxylenes and in which the gasiform mixture withdrawn from the stripping zone is hydrogen admixed with mononitroxylenes substantially uncontaminated with the dinitro derivatives.

4. The method of conditioning a normally liquid feed contaminated with undesired non-volatile constituents by separation of said non-volatile constituents, which comprises contacting the normally liquid material with hydrogen at temperatures above that of the normally liquid feed in a stripping zone for a sufficient period of ---
[1] Barrels per stream day, or the flow based on actual operation.

time to form a mixture of hydrogen and volatilized constituents of the normally liquid material, and thereafter, conducting the said mixture to a hydrogenation zone.

5. In the combined method of removing undesired constituents from a normally liquid oil preparatory to vapor phase hydrogenation and hydrogenating the desired constituents of the oil in vapor phase, the improvement which comprises subjecting the normally liquid oil at a temperature below its normal boiling temperature to contact with hydrogen at a temperature above that of the oil in a stripping zone, wherein a gasiform mixture containing hydrogen with vapors of the oil to be hydrogenated, and a high boiling residue is formed, and thereafter conducting said gasiform mixture to a hydrogenation zone where vapors of the oil are hydrogenated in the presence of a hydrogenation catalyst under hydrogenation conditions.

6. In the combined method of removing undesired constituents from a normally liquid oil preparatory to vapor phase hydrogenation and hydrogenating the desired constituents of the oil, the improvement which comprises subjecting the normally liquid oil to contact with hydrogen at an elevated temperature above the temperature of the liquid material in a stripping zone; flash stripping the normally liquid material; flowing a residual unflashed portion of said normally liquid material downwardly in countercurrent flow to hydrogen which is at an elevated temperature and which is flowing upwardly, further to strip the said residual material, and conducting the thus vaporized material and hydrogen to a hydrogenation zone.

7. In the method of hydrogenating the vapor phase a mixture of crude nitroxylenes and dinitro xylenes, the improvement which comprises dispersing the said mixture in an atmosphere of hydrogen at an elevated temperature, separating the dinitro xylenes by flash stripping; flowing the residual unflashed mixture of nitroxylenes and dinitro xylenes downwardly in countercurrent flow to hydrogen at an elevated temperature flowing upwardly, further to strip the residual material; conducting the thus vaporized nitroxylene-hydrogen mixture to a hydrogenation zone and withdrawing the residual crude mixture from the stripping zone.

8. The combined method of removing undesired constituents from a normally liquid oil preparatory to vapor phase hydrogenation and hydrogenating the desired constituents of the oil, which comprises preheating the oil to be hydrogenated to a temperature below the normal boiling temperature of said oil, flash stripping vapors of a component to be hydrogenated from the said preheated oil in a stripping zone by contact with hydrogen preheated to a temperature above that of the normally liquid oil, and passing the vapors stripped from the liquid material with hydrogen into a hydrogenation zone.

9. The combined method of preconditioning a liquid material to be hydrogenated in the vapor phase and hydrogenating the preconditioned material which comprises preheating the said liquid material to a temperature below its normal boiling temperature, flash stripping vapors of a component to be hydrogenated from the preheated liquid material in a stripping zone by contact with preheated hydrogen, withdrawing the thus obtained vapor and hydrogen directly to a hydrogenation zone at a pressure not higher than the pressure in the stripping zone.

10. The combined method of preconditioning a liquid material to be hydrogenated in the vapor phase and hydrogenating the preconditioned material which comprises preheating said liquid material to a temperature below the normal boiling temperature of a component thereof to be hydrogenated, stripping from the liquid material vapor of said component by means of preheated hydrogen, and carrying the vapor of said component to a hydrogenation zone with said preheated hydrogen.

WILLIAM G. HOCKBERGER.

REFERENCES CITED

The following references are of record in the file of this patent:

UNITED STATES PATENTS

| Number | Name | Date |
|---|---|---|
| 949,954 | Bedford | Feb. 22, 1910 |
| 2,095,578 | Theiler | Oct. 12, 1937 |
| 2,224,685 | Kahl | Dec. 10, 1940 |
| 2,242,466 | Greenewalt et al. | May 20, 1941 |
| 2,252,099 | Rosen | Aug. 12, 1941 |
| 2,292,879 | Kise | Aug. 11, 1942 |